United States Patent
Hirose et al.

(10) Patent No.: US 8,253,544 B2
(45) Date of Patent: Aug. 28, 2012

(54) REMOTE CONTROL DEVICE, REMOTE CONTROL METHOD, AND REMOTE-CONTROLLABLE DEVICE

(75) Inventors: Koji Hirose, Hirakata (JP); Ryuichi Sakai, Hirakata (JP)

(73) Assignee: Panasonic Corporation, Osaka (JP)

( * ) Notice: Subject to any disclaimer, the term of this patent is extended or adjusted under 35 U.S.C. 154(b) by 1926 days.

(21) Appl. No.: 10/530,479

(22) PCT Filed: Mar. 5, 2004

(86) PCT No.: PCT/JP2004/002820
§ 371 (c)(1),
(2), (4) Date: Apr. 6, 2005

(87) PCT Pub. No.: WO2004/080107
PCT Pub. Date: Sep. 16, 2004

(65) Prior Publication Data
US 2005/0285714 A1 Dec. 29, 2005

(30) Foreign Application Priority Data
Mar. 6, 2003 (JP) .................. 2003-059932

(51) Int. Cl.
*G05B 23/02* (2006.01)
(52) U.S. Cl. ............ 340/12.25; 340/13.24; 340/3.54; 340/4.11; 709/208; 709/225; 709/249
(58) Field of Classification Search .......... 340/825, 340/12.22, 12.23, 12.24, 12.25, 12.26, 12.27, 340/12.28, 12.32, 13.24, 13.25, 13.258, 4.11, 340/4.3; 700/276, 17, 19, 10
See application file for complete search history.

(56) References Cited

U.S. PATENT DOCUMENTS

| 6,735,619 | B1 | 5/2004 | Sawada |
| 7,092,794 | B1* | 8/2006 | Hill et al. ................. 700/276 |
| 2002/0111698 | A1* | 8/2002 | Graziano et al. ............. 700/17 |
| 2002/0156899 | A1* | 10/2002 | Sekiguchi ................. 709/227 |
| 2002/0180579 | A1 | 12/2002 | Nagaoka et al. |
| 2003/0038730 | A1 | 2/2003 | Imafuku et al. |
| 2003/0172136 | A1 | 9/2003 | Katagawa et al. |
| 2003/0233432 | A1* | 12/2003 | Davis et al. ................. 709/222 |
| 2004/0071148 | A1 | 4/2004 | Ozaki et al. |

FOREIGN PATENT DOCUMENTS
EP 1416759 5/2004
(Continued)

OTHER PUBLICATIONS

English Language Abstract of JP 2002-064650. English Language Abstract of JP 2003-060664.
English Language Abstract of JP 2002-016622.
English Language Abstract of JP 2001-053779.
English Language Abstract of JP 2001/145140.
English Language Abstract of JP 2003-52093.
English Language Abstract of JP 2003-52082.

*Primary Examiner* — Nabil Syed
(74) *Attorney, Agent, or Firm* — Greenblum & Bernstein, P.L.C.

(57) ABSTRACT

An apparatus and a method of remote control which can enable real time operation of a device in home from a terminal device at remote location through a network are provided. A first server communicates with a terminal device through the Internet and generates device control data for controlling the device. A second server communicates with the device in a predetermined manner to acquire and store a specific address of the device, generates transmission data for transmission of the received device control data from the first server to the device based on the specific address, and transmits the transmission data to the device. This allows real time control of the device from the terminal device through the network to be realized.

13 Claims, 7 Drawing Sheets

FOREIGN PATENT DOCUMENTS

| | | |
|---|---|---|
| EP | 1416760 | 5/2004 |
| JP | 2001-053779 | 2/2001 |
| JP | 2001/145140 | 5/2001 |
| JP | 2002-016622 | 1/2002 |
| JP | 2002-064650 | 2/2002 |
| JP | 2003-52082 | 2/2003 |
| JP | 2003-52093 | 2/2003 |
| JP | 2003-060664 | 2/2003 |
| JP | 3445986 | 6/2003 |
| WO | 02/28083 | 4/2002 |
| WO | 02/101628 | 12/2002 |

\* cited by examiner

REMOTE CONTROL DEVICE, REMOTE CONTROL METHOD, AND REMOTE-CONTROLLABLE DEVICE

TECHNICAL FIELD

The present invention relates to a remote control technique which enables an external terminal device to control an in-home device at a remote location through the Internet.

BACKGROUND ART

A technique for controlling in-home devices from a remote terminal through the Internet has been conventionally developed. There is known, for example, a method for displaying an electronic program guide (EPG) stored in a server on a WEB screen, thereby allowing a user to freely select and program using a terminal device such as a personal computer (PC) or a cellular telephone (see, for example, Japanese Patent Laid-Open Publication No. 2001-145140).

A conventional example of a remote control method for controlling a target device from an external device through the Internet will be described with reference to FIG. 6.

Figure 6:
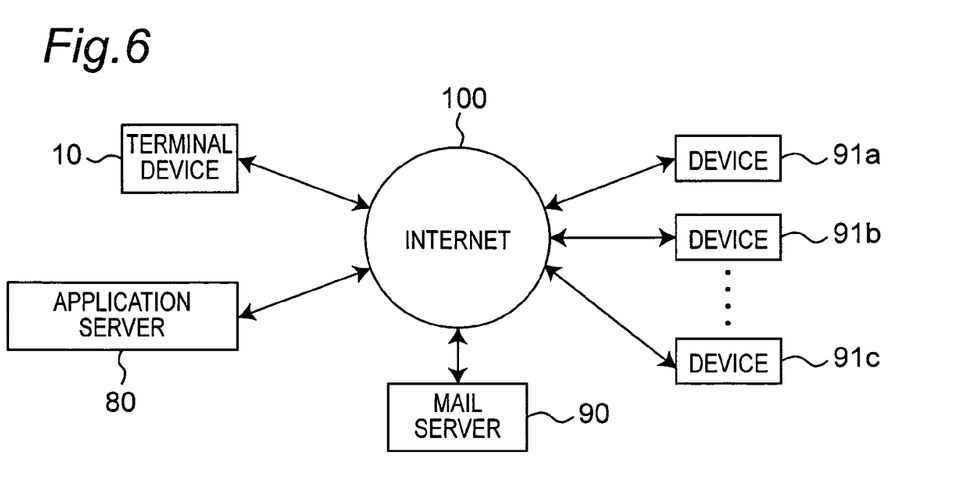
FIG. 6 is an explanatory view which explains a conventional method for remotely controlling an device from an external device through the Internet.

As shown in FIG. 6, an application server 80, a mail server 90, and devices 91a, 91b and 91c are connected to one another through the Internet 100.

A terminal device 10 is a terminal device such as a PC or a cellular telephone which enables a user to view a WEB screen through the Internet. The server 90 is a mail server held by a provider to which the user generally subscribes. The devices 91a, 91b and 91c are devices operable to perform timer recording.

The application server 80 includes means for storing program data for performing a timer recording, and includes functions to generate timer recording data while referring to the stored program data based on a user's operation, and to transmit this timer recording data as an electronic mail (e-mail).

The mail server 90 has functions to receive an e-mail transmitted from one user, to store the received e-mail, and to send the e-mail to the other user. The mail server 90 is often referred to as "mail box".

Each device 91a, . . . has functions to receive the e-mail from the mail server 90, to detect the timer recording data from the received e-mail to store the detected timer recording data. Each device 91a, . . . also has functions to determine whether the timer recording data is stored, and to execute and manage the timer recording.

When receiving, for example, an instruction for timer recording from the terminal device 10 based on the user's operation, the application server 80 generates an e-mail including the timer recording data and transmits the e-mail to the mail server 90 of each provider to which the user subscribes. The device 91a, . . . regularly checks whether the corresponding provider receives the e-mail, thereby extracting the timer recording data from the received e-mail to control a timer recording operation based on the timer recording data. This operation will now be described specifically.

When receiving a display request based on the user's operation from the terminal device 10, the application server 80 converts the program data into data in an HTML (Hyper Text Markup Language) format so that user can browse the stored program data on the WEB screen and a display on which the user can easily operate can be provided. The application server 80 then transmits the HTML format data to the terminal device 10. The user can select a program while viewing a content displayed by the terminal device 10. Data indicating a user's selected item is transmitted to the application server 80 which then analyzes the data. If detecting that the data is the timer recording instruction, the application server 80 generates timer recording data. That is, the application server 80 generates the timer recording data while referring to data indicating the user's selected item and to the stored program data. This timer recording data normally includes data such as a recording start time, a recording end time, and a channel number. The application server 80 converts the timer recording data into data in an e-mail format, and transmits the data in e-mail format to a mail address (mail server 90) designated by the user. The mail server 90 stores the received e-mail. The device 91a receives the e-mail from the mail server 90 at an arbitrary timing, extracts the timer recording data from the received e-mail, and controls a timer recording operation based on the timer recording data.

DISCLOSURE OF THE INVENTION

Problems to be Solved by the Invention

An increase in the number of e-mail users and an increase in the number of unwanted mail and the like cause it often take long time since sending an e-mail until receiving the e-mail. In an extreme case, the e-mail arrives half a day later. As a result, a timer recording with the e-mail causes a disadvantage that a desired time when the timer recording is conducted passes and the timer recording operation cannot be executed. In addition, a device status can not be known at real time. For this reason, it is disadvantageously impossible for a system to deal with a checking as to whether the timer recording is executed and changing of a timer recording which has been already input when timer recordings are filled.

The present invention has been achieved to solve the conventional problems. It is an object of the present invention to provide an operation environment which exhibits a real time performance and is close to the state in which a device can be operated by a remote controller, in remote control of the device through a network.

Means for Solving Problems

In order to solve the problems, the present invention provides a second server which is appropriately notified of an address or an device status from a remote-controlled device and manages the notified address, and links the operation of the second server with that of a first server which realizes various additional functions for timer recording information and the like, thereby resulting in a remote control environment which exhibits a real time performance.

A remote controller according to the present invention is a remote controller which enables a terminal device to control a device through a network. The remote controller includes a first server operable to communicate with the terminal device through the network, and generate device control data for controlling the device based on a request from the terminal device, and a second server operable to acquire and store a latest address of the device on the network by communicating with the device at predetermined time intervals. The second server receives the device control data from the first server, generates first transmission data including the device control data, and transmits the first transmission data to the device.

The first server may include data storage operable to store control information that is information necessary to control an operation of the device, display data generator operable to generate display data that allows the terminal device to display the control information, and control data generator operable to generate the device control data in response to a request from the terminal device. The second server may include address storage operable to store an address of the device on the network, address generator operable to generate an address of the device controlled according to the device control data with reference to the stored address and based on the device control data received from the first server, and transmission data generator operable to generate the first transmission data including the address of the device and the device control data to the device, and transmit the first transmission data to the device. The device may include section operable to extract the device control data from the first transmission data, and section operable to control the operation of the device based on the extracted the device control data.

The device may include section operable to detect a status of a target to be controlled in the device, and section operable to generate second transmission data including status information that is information on the detected operating status, and transmit the second transmission data to the second server. The second server may include section operable to extract the status information from the second transmission data received from the device, and section operable to generate third transmission data including the extracted status information, and transmit the third transmission data to the first server. The first server may include section operable to extract the status information from the third transmission data received from the second server, and generate the display data using the extracted status information.

When the device is a video recording and reproducing apparatus, the device control data may be information about programs, and be timer recording data for allowing timer recording to be conducted for a designated program at a designated time in accordance with the request from the terminal.

When the device is a temperature controlling apparatus, the device control data may be data for controlling temperature, and be data for controlling temperature of the temperature controlling apparatus.

Functions into which a function of the first server and a function of the second server are integrated can be provided by three or more servers.

Functions into which a function of the first server and a function of the second server are integrated can be provided by one server.

A remote control method according to the present invention is a remote control method for enabling a terminal device to control a device through a network. The method includes acquiring and storing a latest address of the device on the network by communicating with the device at predetermined time intervals, and communicating with the terminal device through the network, generating device control data for controlling the device based on a request from the terminal device, generating first transmission data including the device control data, and transmitting the first transmission data to the device.

Advantageous Effects over Prior Art

According to the present invention, it is possible to realize a real time performance in controlling the device to be controlled from the terminal device at a remote location through the network and in displaying a status of the controlled device in response to a request from the terminal device. That is, according to the present invention, a remote control environment which provides the real time operation close to an operation of the device (remote-controlled device) with a remote controller from the terminal device, in operation from the device terminal or a status display from the device. Thus it is possible for the remote terminal device to check whether a desired control such as timer recording is executed. Further, in dealing with timer recording information, it is possible to change a timer recording setting which has been input once when timer recording settings fill.

Further, if the control data is information that includes EPG (Electronic Program Guide) timer recording, the present invention can be applied to a so-called video recording and reproducing device. If the control data is temperature setting information, the present invention can be applied to a temperature controlling apparatus such as an air conditioner. In addition, when the number of controlled devices increases or a load on the server increases, the load may be appropriately share among a plurality of servers.

BEST MODE FOR CARRYING OUT THE INVENTION

An embodiment of a remote control system according to the present invention will be described hereinafter with reference to the accompanying drawing. The remote control system to be described hereinafter can enable a terminal at a remote location to control an operation of a controlled device through a network.

Figure 1A:
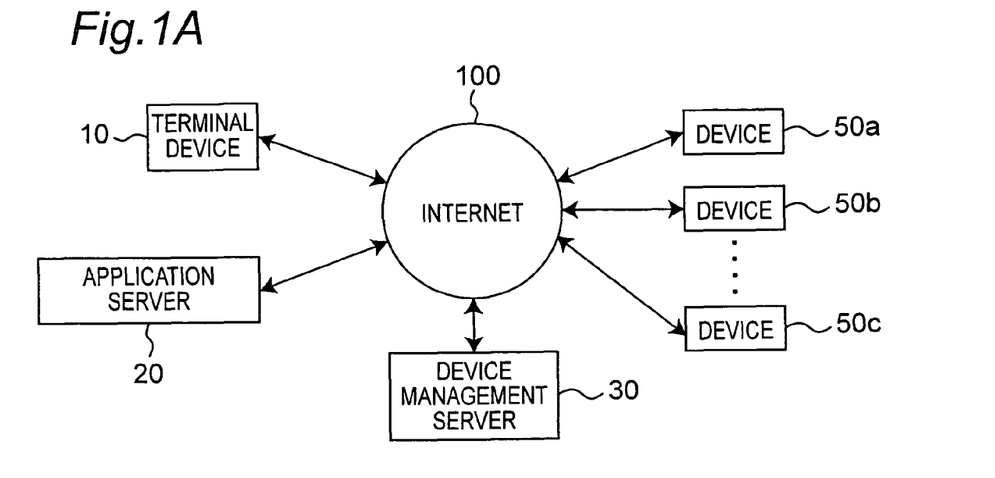
FIG. 1A is a block diagram which shows an example of a configuration of a remote control system according to the present invention.
Figure 1B:
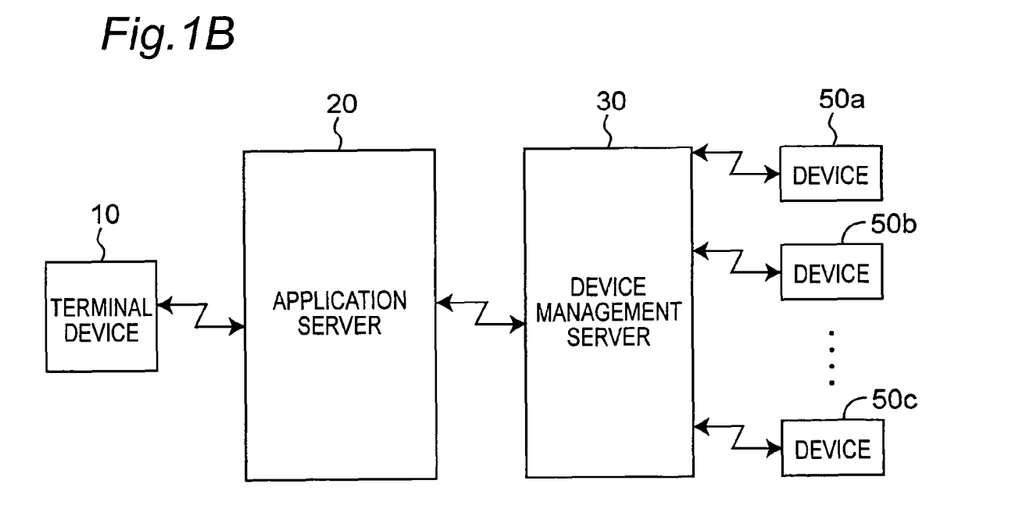
FIG. 1B is an explanatory view which explains a connection relationship among elements of the remote control system in light of a data flow.

FIG. 1A shows an example of a configuration of the remote control system according to the present invention. FIG. 1B is an explanatory view for a connection relationship among the respective elements of the remote control system in light of a data flow.

Referring, to FIG. 1A, a terminal device 10 is a terminal device operable to display a WEB screen on the Internet 100 such as a PC or a cellular telephone. Devices 50a, 50b, and 50c are devices (remote-controlled devices) which are remotely controlled through the Internet 100. An application server (a first server) 20 is a dedicated server provided in a provider which provides a service for timer recording of programs. The application server 20 generates screen data to be displayed on the terminal device 10, generates control data based on an operation on the terminal, performs an authentication processing, and does other things. A device management server (a second serer) 30 is a server which manages respective network addresses of the devices 50a, 50b, and 50c connected to the server 30 through the Internet 100 which are dynamically changed.

The devices 50a, 50b, and 50c may be present in the same house or in different houses (that is, may be managed by different users). If the devices 50a, 50b, and 50c are located in the same house, they may be connected to one another through a local area network and further connected to the Internet 100 through a router or a modem. The device 50a, 50b or 50c contains, for example, electric apparatus including a video recording and reproducing apparatus such as a DVD recorder and a temperature controlling apparatus such as an air conditioner or a refrigerator.

Figure 2A:
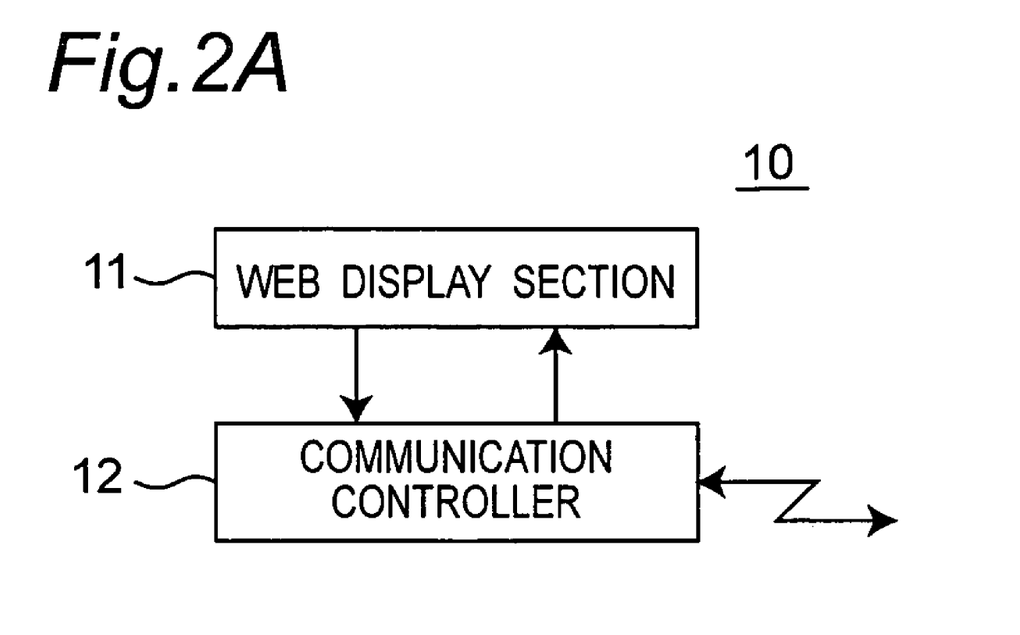
FIG. 2A is a block diagram which shows a configuration of a terminal device.
Figure 2B:
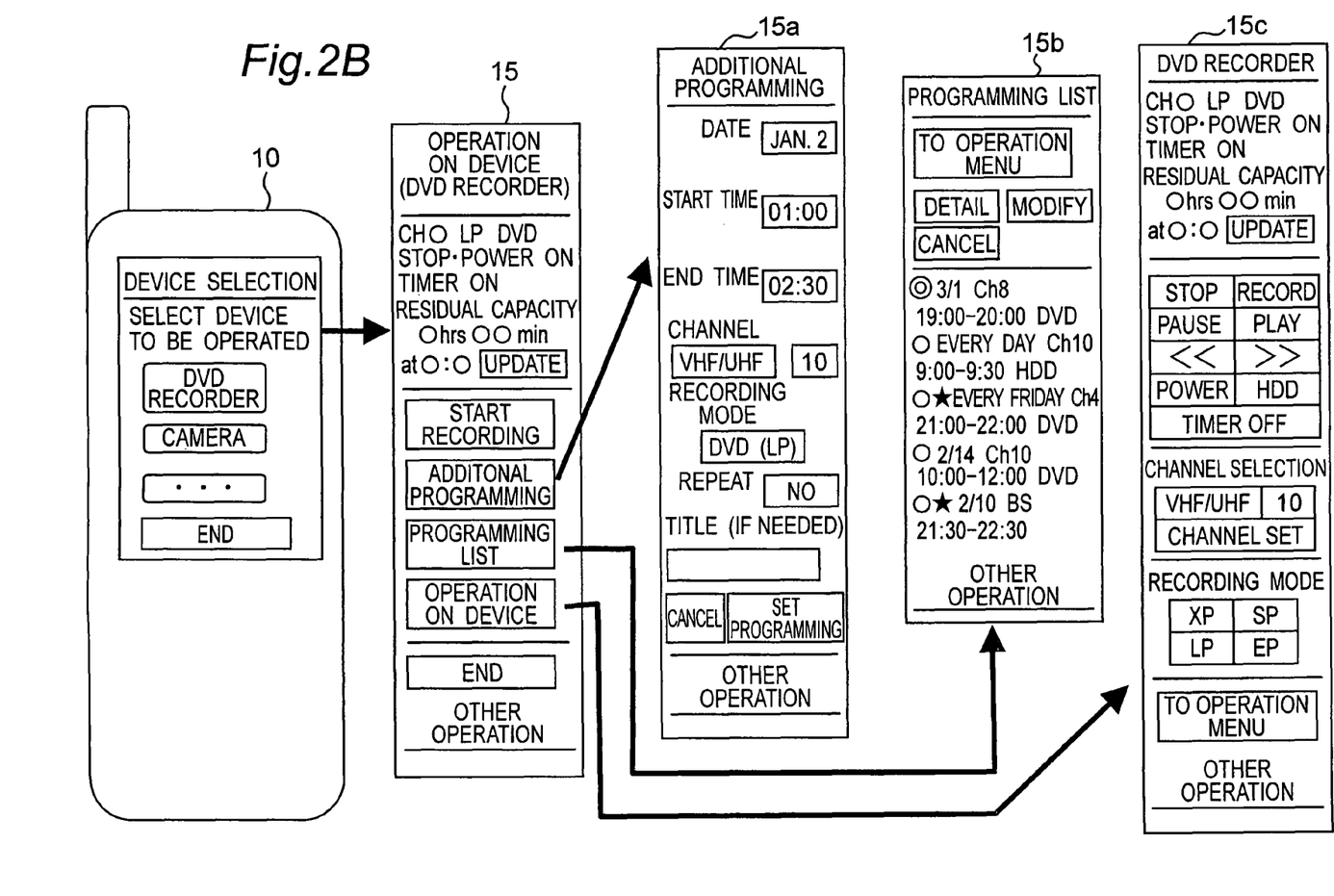
FIG. 2B is an explanatory view which explains an example of a screen displayed for controlling an operation of a device (DVD recorder) from the terminal device (cellular telephone).

FIG. 2A shows a configuration of the terminal device 10. As shown in FIG. 2A, the terminal device 10 includes a WEB display section 11 which displays a WEB screen image and a communication controller 12 for connecting the terminal device 10 to the Internet 100. FIG. 2B is an explanatory view for a display of the WEB display section 11 when the operation of the device (DVD recorder) is controlled from the terminal device (cellular telephone) 10. By user's operating the terminal device 10 while viewing the display of the WEB display section 11, display screens 15, 15a, 15b and 15c for controlling the device are displayed.

Figure 3:
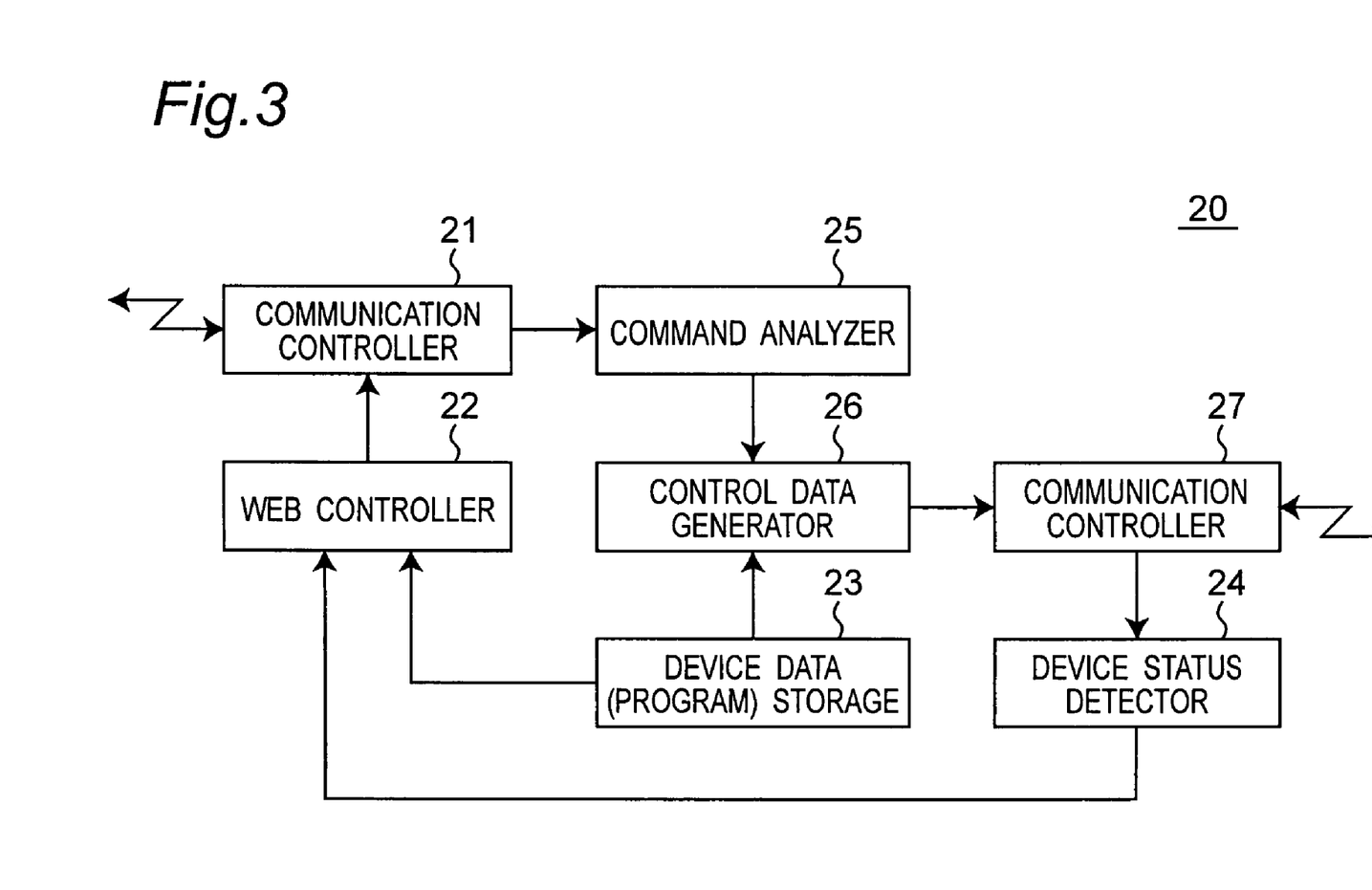
FIG. 3 is a block diagram which shows a configuration of an application server.

FIG. 3 shows a configuration of the application server 20. In FIG. 3, the application server 20 includes a communication controller 21 for connecting the application serer 20 to the Internet 100, a WEB controller 22 which provides the WEB screen image displayed on the terminal device 10, and a device data storage 23 which stores data for controlling the device 50a, . . . . The application server 20 also includes an device status detector 24 which detects information on a status of each device and which outputs the information to the WEB controller 22, a command analyzer 25 which analyzes a command received by the communication controller 21, a control data generator 26 which generates device control data based on a command transmitted based on a user's operation while referring to the device data storage 23, and a communication controller 27 which communicates with the device management server 30.

Figure 4:
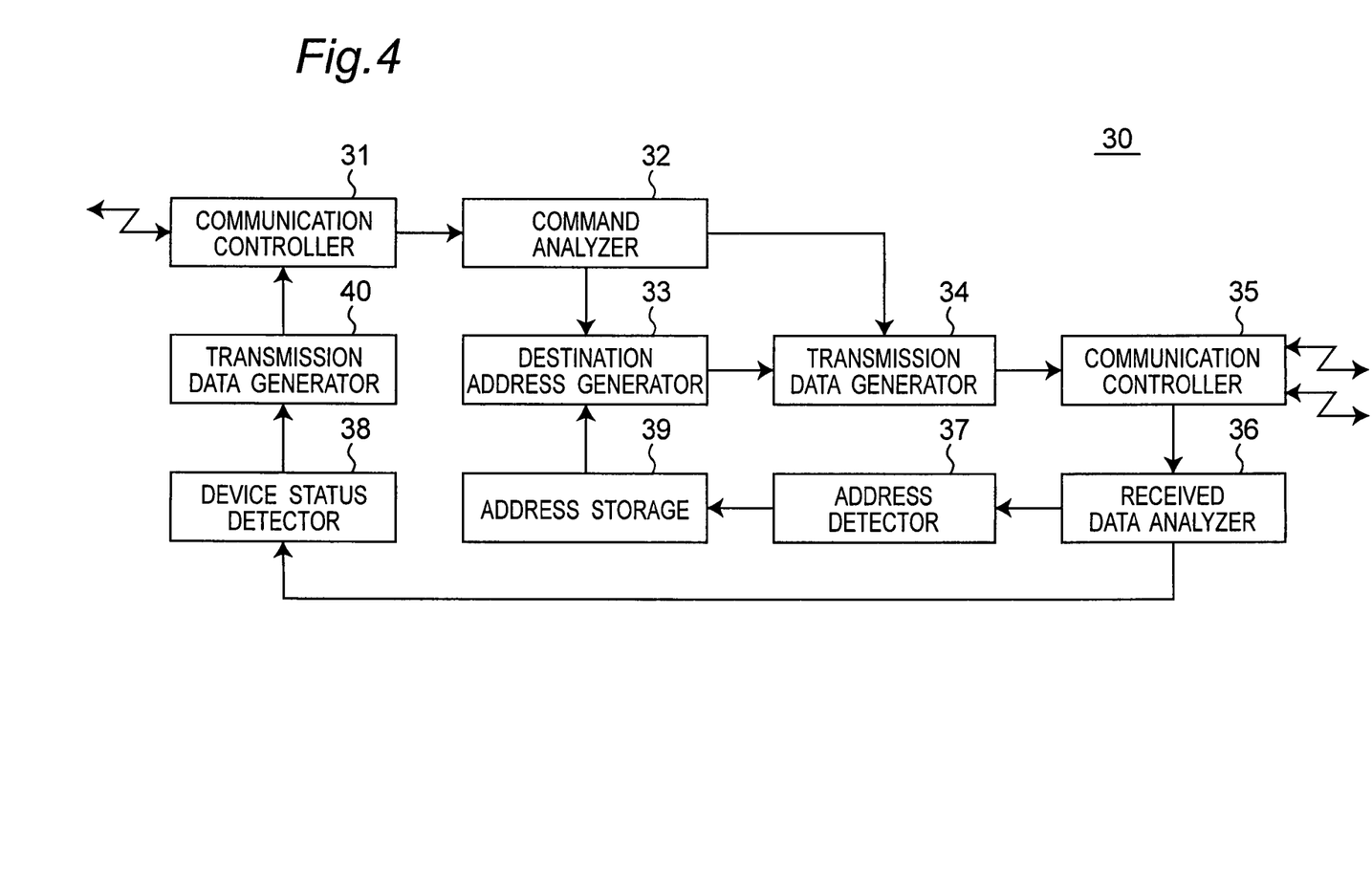
FIG. 4 is a block diagram which shows a configuration of a device management server.

FIG. 4 shows a configuration of the device management server 30. The device management server 30 includes a communication controller 31 which communicates with the application server 20, a command analyzer 32 which analyzes a command received by the communication controller 31, a destination address generator 33 which detects an address specific to each device, and a transmission data generator 34. The device management server 30 also includes a communication controller 35 which communicates with the respective devices 50a, . . . through the Internet 100, a received data analyzer 36 which analyzes the command received by the communication controller 35, an address detector 37 which detects the address specific to each of the devices 50a, . . . from the received command, a device status detector 38 which detects information on a status of each of the devices 50a, . . . from the received command, an address storage 39 which temporarily stores the address specific to each of the devices 50a, . . . , and a transmission data generator 40.

Figure 5:
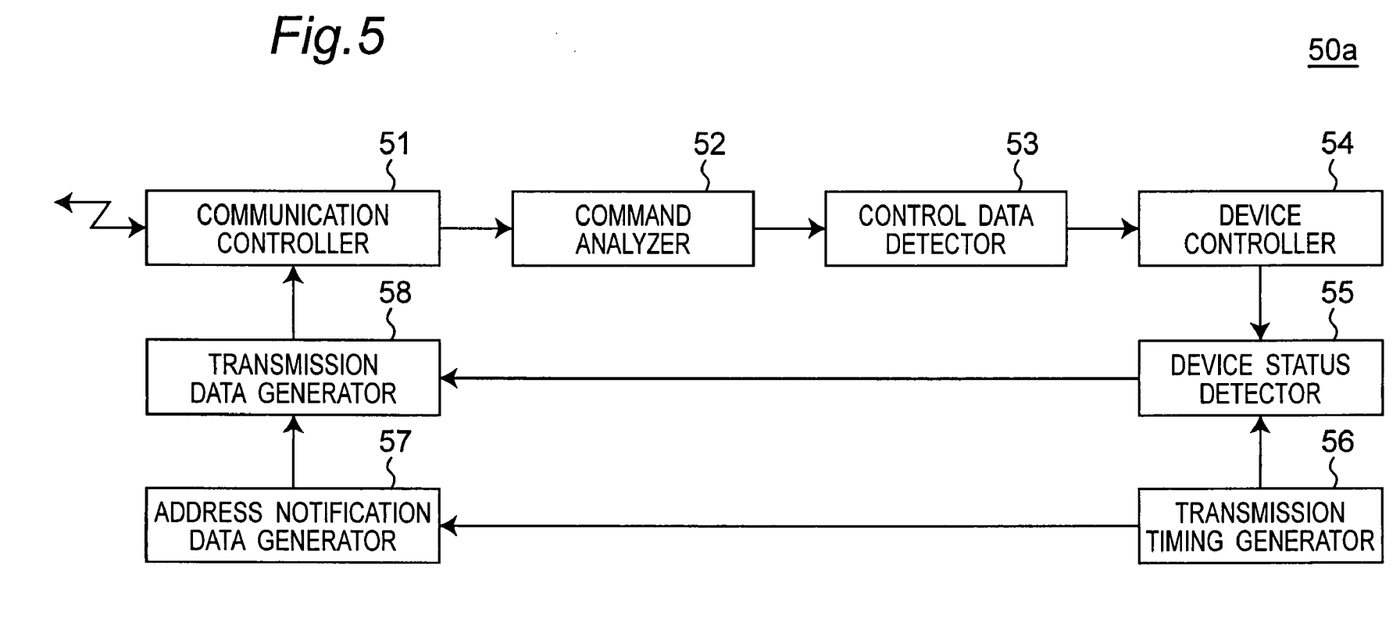
FIG. 5 is a block diagram which shows a configuration of a remote-controlled device such as a video recording and reproducing apparatus.

FIG. 5 shows a configuration of the device 50a such as a video recording and reproducing apparatus which is remotely controlled. The devices 50b and 50c are equal in configuration to the device 50a. The device 50a includes a communication controller 51, a command analyzer 52 which analyzes a command received by the communication controller 51, a control data detector 53 which detects control data from the received command, and a device controller 54 which specifically controls a control target in the device 50a based on the control data. The device 50a further includes an device status detector 55 which detects a status of the control target in the device (an device status) based on information from the device controller 54, a transmission timing generator 56 which measures an appropriate time interval, an address notification data generator 57 which generates data for notifying the device management server 30 of an address, and a transmission data generator 58.

The respective communication controllers of the servers 20 and 30 and the devices 50a, . . . are sections that provide functions for connecting the corresponding servers or devices to the Internet 100. Many cases are assumed for the connection of the devices 50a, . . . to the Internet 100 such as a case of using a telephone line, a case of using wireless communication, a case of using a cable TV line, and a case of using an optical fiber cable.

In this embodiment, for convenience of description, each server 20 or 30 includes a plurality of communication controllers. However, the communication controllers may be integrated into one controller.

Operations of the remote control system according to the present invention will be described in detail.

First, a method executed by the device management serer 30 for managing a specific address of each device 50a, . . . on the network will be described.

The transmission timing generator 56 of the device 50a generates an arbitrary timing so as to transmit its own address (e.g., an IP address) stored in a predetermined storage area to the device management server 30. Based on this timing command, the address notification data generator 57 of the device 50a generates packet data according to an HTTP (Hyper Text Transfer Protocol), UDP (User Datagram-Protocol), or the like. The transmission data generator 58 transmits the packet data to the device management server 30 through the communication controller 51 after applying a necessary processing such as encryption to information such as the device address.

The device management server 30 receives the data from the device 50a through the communication controller 35, and causes the received data analyzer 36 to decode the received data and thus to transmit the decoded data to the address detector 37. The address detector 37 analyzes the data transmitted from the device 50a, and stores a source address in the address storage 39 as the device address.

That is, since the packet data is transmitted from the device 50a to the device management server 20 at a predetermined timing, the device management server 20 can update the device address synchronously with the transmission of the packet data. In other words, even if the specific address of the device 50a on the Internet 100 dynamically changes, the device management server 20 can appropriately update the address and thus can always manage the latest address of the device 50a (see Japanese Patent No. 3445986).

The network-specific address of the device 50a, . . . connected to the Internet 100 is thus stored in the address storage 39.

The address storage 39 needs to manage a device number (also referred to as "device ID") for identifying the device itself and a port number while associating them with the device address of the device on the Internet 100. Management of the device number and the port number as well as the network-specific device address allows one device to be identified uniquely, even if a plurality of devices are present in one house.

Next, a processing for transmitting the device control data from the terminal device 10 to the device 50a (or the device 50b or 50c) will be described.

When a display request is transmitted from the terminal device 10 to the application server 20, the application server 20 causes the WEB controller 22 to convert the data for controlling the device stored in the device data storage 23 into data in HTML format or the like so that the user can view the data on the WEB screen of the terminal device 10 or a screen image for providing user's easy operation on the screen is made, and then transmits the data in HTML-format or the like to the terminal device 10 through the communication controller 21. The data for controlling the device includes data regarding a timer recording of video if the device 50 is a video recording and reproducing device, or includes data regarding a temperature setting if the device 50 is a temperature controlling apparatus. The data for controlling the device includes data regarding imaging control such as zooming and panning if the device 50 is an imaging device. As can be seen, it suffices that the data for controlling the device is data depending on the control target.

When receiving data in HTML-format or the like from the application server 20, the terminal device 10 displays the data by the WEB display section 11. The user operates the terminal device 10 while viewing a displayed content, and selects control items to the device 50a. Data indicating the user's selected control item is transmitted to the application server 20 through the communication controller 12 of the terminal device 10.

When receiving the data through the communication controller 21, the application server 20 causes the command analyzer 25 to analyze the received data and to detect whether the data is a control instruction for the device. If detecting that the received data is the control instruction for the device, the command analyzer 25 instructs the control data generator 26 to generate the device control data. The control data generator 26 generates the device control data with reference to the data that indicates the user's selected item and the data stored in the device data storage 23, and transmits the generated data to the device management server 30 through the communication controller 27.

The device management server 30 receives the data through the communication controller 31, and causes the command analyzer 32 to analyze the received data. If it is determined that the received data is the device control data, the device management server 30 instructs the destination address generator 33 to generates an address. The destination address generator 33 reads the specific address of a target device from the address storage 39, and generates a destination address. The transmission data generator 34 transmits the destination address together with the device control data to the device 50a through the communication controller 35.

The device 50a receives the data through the communication controller 51, and causes the command analyzer 52 to analyze the received data and to detect whether the received data includes the device control data. If it is detected that the received data includes the device control data, the control data detector 53 extracts the device control data from the received data. This device control data is transmitted to the device controller 54, and the device 50a is controlled based on it.

Thereafter, information on a status of the device 50a is transmitted from the device 50a to the terminal device 10 through the device management server 30. The status of the device 50a (status of a target to be controlled) is detected by the device status detector 55. The transmission data generator 58 converts the device status into transmission data and transmits the data to the device management server 30 through the communication controller 51 every time the device status detector 55 detects the change in the device status or at predetermined intervals.

The device status (that is, information on the device status) includes an operating status of the device 50a. The operating status of the device 50a includes, for example, a status of the device regarding a timer recording or the like if the device 50a is a video recording and reproducing apparatus, includes a temperature status if the device 50a is a temperature controlling apparatus, or includes an imaged picture if the device 50a is an imaging device. As can be seen, it suffices that the information on the device status is information depending on the control target.

The device management server 30 receives the data through the communication controller 35. The received data analyzer 36 analyzes the received data and determines whether the received data includes status data. If the received data includes the status data, the device status detector 38 extracts the status data of the device, and the transmission data generator 40 converts the status data into transmission data again. The transmission data is transmitted to the application server 20 through the communication controller 31.

The application server 20 receives the data through the communication controller 27, causes the device status detector 24 to extract the device status data, and causes the WEB controller 22 to convert the extracted device status data into HTML-format data for displaying the device status. This HTML-format data is transmitted to the terminal device 10 and displayed by thereon. The user can browse the data through the WEB display section 11 of the terminal device 10.

As described, according to this embodiment, provided is the device management server 30 which is appropriately notified of the address or the device status from the device 50a or the like which is the remote-controlled device, and which manages the notified information. This device management server 30 is caused to operate in conjunction with the application server 20 which manages and generates the device control data. Thus, it is possible to control the devices 50a, . . . remotely at real time from the terminal device 10.

In the above description, if the device (remote-controlled device) is assumed as a video recording and reproducing apparatus, the device control data stored, generated, and transmitted by the application server 20 includes timer recording data of programs. If the device (remote-controlled device) is assumed as the temperature controlling device such as the air conditioner, the data for device control stored, generated, and transmitted by the application server 20 includes data for controlling temperature.

In the embodiment, the system is arranged to include two servers, i.e., the application server 20 and the application management server 30. Alternatively, these functions may be integrated and packaged into one server. Further, these functions may be distributed and packaged into three or more servers.

In the description, one example in which the servers 20 and 30, the devices 50a, . . . and the terminal device 10 communicate with one another through the Internet. Alternatively, a network of a type other than the Internet may be employed.

It is understood that, in the description, the servers 20 and 30, the devices 50a, . . . , and the terminal device 10 can be achieved by a computer, and the respective functions can be realized by executing predetermined programs.

INDUSTRIAL APPLICABILITY

The present invention is useful for a remote control system which controls in-home devices from a terminal at a remote location through the Internet.

The present invention has been described while referring to the specific embodiment. It is obvious to those skilled in the art that many other changes and modifications and other applications can be made. Therefore, the present invention is not limited to the specific disclosure given herein but can be limited only to appended claims.

The invention claimed is:

1. A remote controller system which enables a terminal device to control a device through a network, comprising:
 a first server operable to communicate with the terminal device through the network, and generate device control data for controlling the device based on a request from the terminal device; and
 a second server operable to acquire and store a latest ip address of the device on the network by communicating with the device at predetermined time intervals, the second server receiving the device control data from the first server, generating first transmission data including the device control data, and transmitting the first transmission data to the device in accordance with the stored latest ip address of the device.

2. The remote controller system according to claim 1, wherein
the first server comprises:
a data storage operable to store control information that is information necessary to control an operation of the device;
a display data generator operable to generate display data that allows the terminal device to display the control information; and
a control data generator operable to generate the device control data in response to a request from the terminal device,
the second server comprises:
an address storage operable to store an ip address of the device on the network;
an address generator operable to generate an ip address of the device controlled according to the device control data with reference to the stored ip address, based on the device control data received from the first server; and
a transmission data generator operable to generate the first transmission data including the ip address of the device and the device control data to the device, and transmit the first transmission data to the device; and
the device comprises:
a section operable to extract the device control data from the first transmission data; and
a section operable to control the operation of the device based on the extracted data for device control.

3. The remote controller system according to claim 1, wherein
the device comprises:
a section operable to detect a status of a target to be controlled in the device; and
a section operable to generate second transmission data including status information that is information on the detected operating status, and transmit the second transmission data to the second server,
the second server comprises:
a section operable to extract the status information from the second transmission data received from the device; and
a section operable to generate third transmission data including the extracted status information, and transmit the third transmission data to the first server, and
the first server comprises a section operable to extract the status information from the third transmission data received from the second server, and generate the display data using the extracted status information.

4. The remote controller system according to claim 1, wherein
the device is a video recording and reproducing apparatus, and
the device control data is information about programs, and is timer recording data for allowing timer recording to be conducted for a designated program at a designated time in accordance with the request from the terminal.

5. The remote controller system according to claim 1, wherein
the device is a temperature controlling apparatus, and
the device control data is data for controlling a temperature of the temperature controlling apparatus.

6. The remote controller system according to claim 1, wherein functions into which a function of the first server and a function of the second server are integrated are provided by at least three servers.

7. A remote control system method for enabling a terminal device to control a device through a network, the method comprising:
using a first server to acquire and store a latest ip address of the device on the network by communicating with the device at predetermined time intervals; and
using a second server to communicate with the terminal device through the network, generate device control data for controlling the device based on a request from the terminal device, generate first transmission data including the device control data, and transmit the first transmission data to the device in accordance with the stored latest ip address of the device.

8. The remote control system method according to claim 7, comprising:
storing control information that is information necessary to control an operation of the device, and generating display data for allowing the terminal device to display the control information;
generating the device control data in response to a request from the terminal device, and generating an ip address of the device controlled by the device control data with reference to the stored ip address and based on the device control data;
generating the first transmission data including the ip address of the device and the device control data, and transmitting the first transmission data to the device; and
controlling the operation of the device based on the device control data included in the first transmission data.

9. The remote control system method according to claim 7, further comprising detecting an operating status of the device, receiving the transmission data including status information that is information on the detected operating status of the device from the device, extracting the status information from the transmission data thus received, and generating the display data using the extracted status information.

10. The remote control system method according to claim 7, wherein the device is a video recording and reproducing apparatus, and the device control data is information about programs.

11. The remote control system method according to claim 7, wherein the device is a temperature controlling apparatus, and the device control data is information for designating a temperature.

12. A remote-controlled device controlled by the remote control system method according to claim 7, wherein the device control data is information about programs.

13. A remote-controlled device controlled by the remote control system method according to claim 7, wherein the device control data is information for designating a temperature.

* * * * *